United States Patent [19]
Okamoto et al.

[11] Patent Number: 5,093,742
[45] Date of Patent: Mar. 3, 1992

[54] FERRO-ELECTRIC LIQUID-CRYSTAL PANEL HAVING A CHIRAL-NEMATIC MESOPHASE IN A PHASE TRANSLATION SYSTEM

[75] Inventors: Shinichi Okamoto; Hirokazu Ono; Masanori Fujita, all of Tokyo, Japan

[73] Assignee: Seikosha Co., Ltd., Tokyo, Japan

[21] Appl. No.: 554,234

[22] Filed: Jul. 17, 1990

[30] Foreign Application Priority Data

Jul. 25, 1989 [JP] Japan .................................. 1-191798

[51] Int. Cl.⁵ ............................................. G02F 1/13
[52] U.S. Cl. ...................................... 359/104; 359/75; 359/78
[58] Field of Search ................ 350/341, 350 S, 347 E, 350/347 R, 346, 340

[56] References Cited

U.S. PATENT DOCUMENTS

| | | | |
|---|---|---|---|
| 4,146,656 | 3/1979 | Kinugawa et al. | 359/78 |
| 4,653,865 | 3/1987 | Kando et al. | 350/346 |
| 4,778,259 | 10/1988 | Kitayama et al. | 350/341 |
| 4,779,960 | 10/1988 | Kozaki et al. | 350/346 |
| 4,832,462 | 5/1989 | Clark et al. | 359/78 |
| 4,836,653 | 6/1989 | Yoshino et al. | 359/78 |
| 4,896,947 | 1/1990 | Leenhouts | 350/346 |
| 4,952,030 | 8/1990 | Nakagawa et al. | 350/347 E |

FOREIGN PATENT DOCUMENTS 52-43446  4/1977  Japan ............................... 350/347 E

*Primary Examiner*—Rolf Hille
*Assistant Examiner*—Minh Loan Tran
*Attorney, Agent, or Firm*—Jordan and Hamburg

[57] ABSTRACT

A ferro-electric liquid-crystal panel comprises two substrates with electrodes and alignment layers which face one another, and a ferro-electric liquid-crystal sealed therebetween to align the molecules thereof in a homogeneous fashion. The alignment direction of one of the alignment layers is twisted at an angle between 110 and 150 degrees relative to that of the other alignment layer. The direction of twist defined by the alignment layer, as viewed in front, is opposite to the twist direction of the liquid-crystal molecules in chiral-nematic mesophase.

4 Claims, 3 Drawing Sheets

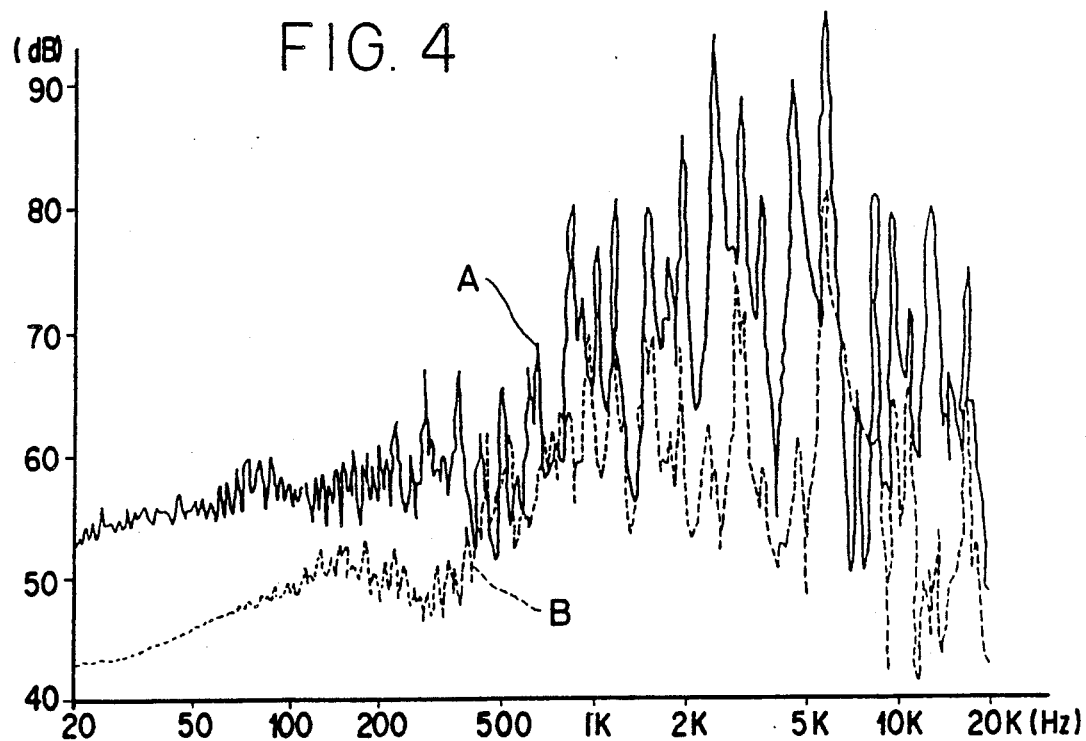
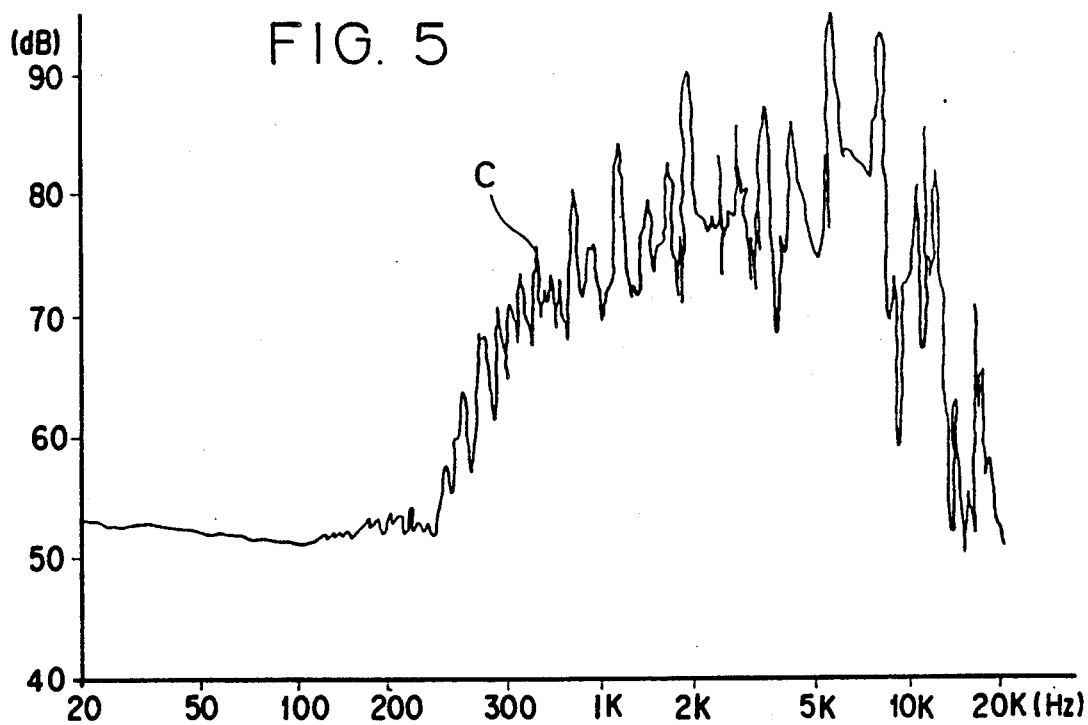

FERRO-ELECTRIC LIQUID-CRYSTAL PANEL HAVING A CHIRAL-NEMATIC MESOPHASE IN A PHASE TRANSLATION SYSTEM

FIELD OF THE INVENTION

The present invention relates to a ferro-electric liquid-crystal panel which can be used both as a piezoelectic element for a sound generating device and as an indication element for an indicator.

BACKGROUND OF THE INVENTION

In the manufacture of a conventional ferro-electric liquid-crystal panel for an indicator, upper and lower substrates have electrodes and alignment layers processed by rubbing and the like and a liquid crystal is placed between the substrates. In order to align the liquid crystal uniformly, the alignment direction of one of the alignment layers is parallel, but opposite (180 degrees) to that of the other alignment layer.

It is well known that a ferro-electric liquid-crystal panel can function as a sound generating device. When alignment directions of two alignment layers are opposite (180 degrees), however, a ferro-electric crystal-liquid panel is not suitable for use as a sound generating device. In order for such a ferro-electric liquid-crystal panel to properly generate sound, the alignment direction of one of the two alignment layers must be at right angles to that of the other electrode base plate. With this arrangement, however, the panel can not be used as an indicator.

As explained above, since a conventional ferro-electric liquid-crystal panel can not be used both as an indicator and a sound generating device, panels have to be designed either as an indicator or as a sound generating device according to their intended use, and this is not efficient.

SUMMARY OF THE INVENTION

Accordingly, it is an object of the present invention to provide a ferro-electric liquid-crystal panel which can function not only as an indicator, but as a sound generating device as well.

In order to achieve the foregoing object, a ferro-electric liquid-crystal panel is provided comprising two substrates placed in facing relation with one another. Each of the substrates has an electrode and an alignment layer. A ferro-electric liquid-crystal is sealed between the substrates such that the molecules thereof are aligned in a homogeneous fashion and have a chiral-nematic mesophase in a phase translation system. The alignment direction of one of the alignment layers is twisted at an angle between 110 and 150 degrees relative to that of the other alignment layer. The direction of twist defined by the alignment directions of the alignment layers, as viewed from the front, is opposite to the twist direction of the liquid-crystal molecules in said chiral-nematic mesophase.

The present invention will now be described by way of example with reference to the drawings.

BRIEF DESCRIPTION OF THE DRAWINGS

The drawings show one embodiment of the invention.

FIG. 4 is a graph showing the piezo-electric characteristic of the ferro-electric liquid-crystal panel of the present invention and that of a conventional ferro-electric liquid-crystal panel.

FIG. 5 is a graph showing the characteristic of a conventional ferro-electric liquid-crystal panel designed exclusively as a sound generating device.

DESCRIPTION OF THE PREFERRED EMBODIMENTS

Figure 1:
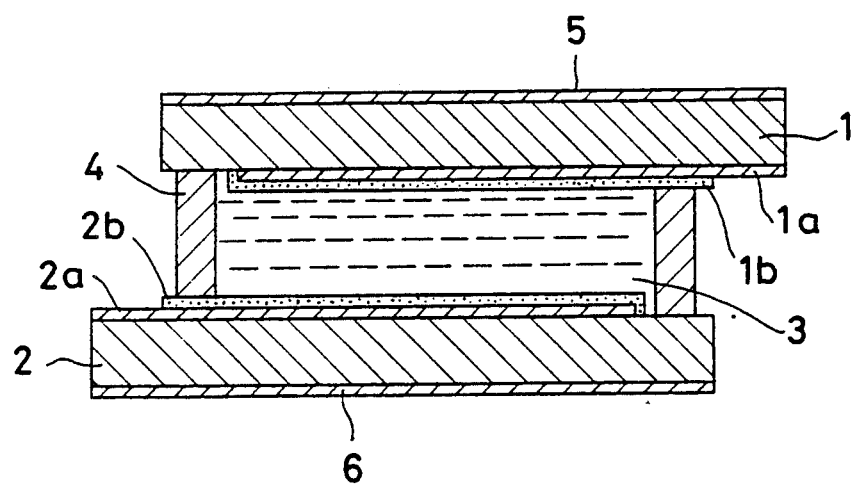
FIG. 1 is a sectional view of a ferro-electric liquid-crystal panel.

As shown in FIG. 1, two substrates 1 and 2 are spaced a predetermined distance apart and placed in a facing relation to one another. A ferro-electric liquid-crystal 3 is situated between the two substrates 1, 2 and sealed by a sealant 4. A driving electrode 1a and a alignment 1b are attached to the lower surface of the substrate 1, and a driving electrode 2a and an alignment layer 2b are attached to the upper surface of the substrate 2. Polarizing plates 5 and 6 are also attached to the upper surface of the substrate 2 and the lower surface of the substrate 2, respectively.

The ferro-electric liquid-crystal 3 is made of a material which has a chiral-nematic mesophase N* (a cholesteric mesophase Ch) in a phase translation system.

Figure 2:
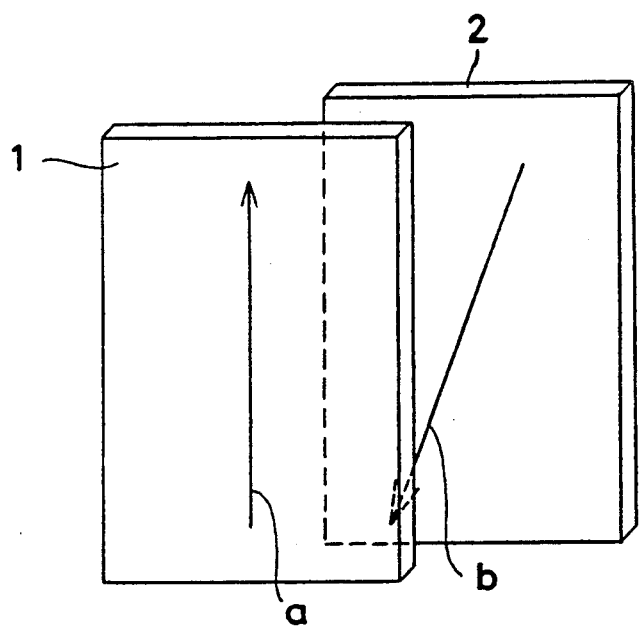
FIG. 2 is a perspective view of two substrates showing their alignment directions.
Figure 3:
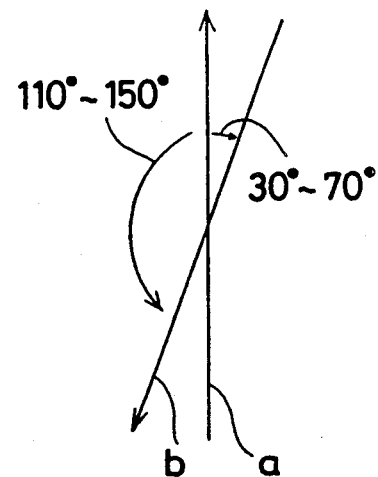
FIG. 3 is a schematic view showing the angle of alignment.

The alignment layers 1b and 2b are formed by applying polyimide by spin coating, baking and oriented by rubbing or the like. Reference is now made to alignment of the substrates 1 and 2 with the ferro-electric liquid-crystal 3 having liquid crystal molecules in the chiral-nematic mesophase twisted in a clockwise direction. The alignment direction of the substrate 1 is shown by the arrow a, and the alignment direction of the other substrate 2 is shown by the arrow b as viewed from the front in FIG. 2. As seen in FIG. 3, the angle between intersecting arrows is between 110 and 150 degrees. In this way, the alignment directions of the substrates 1 and 2 are twisted counterclockwise. The direction of twist defined by these alignment directions is opposite to the twist direction of the liquid crystal molecules of the ferro-electric liquid crystal 3. With this arrangement, the liquid crystal molecules of the ferro-electric liquid crystal 3 in the chiral-nematic mesophase are twisted from the substrate 1 toward the substrate 2 or in a clockwise direction at an angle between 30 and 70 degrees. When the temperature of the ferro-electric liquid crystal 3 is lowered to the temperature of the smectic C* (Smc*) mesophase to provide a ferro-electric characteristic, it is uniformly aligned and can be used as an indicator. The pitch of twist in the chiral-nematic mesophase is fairly large relative to the space between the two substrates 1 and 2.

FIG. 4 is a graph showing the characteristic of the ferro-electric liquid-crystal panel of the present invention with an alignment angle of 130 degrees, using a ferro-electric liquid crystal on the market, ZLI-3774 (manufactured by Merk Corp.) and a conventional ferro-electric liquid-crystal panel used as an indicator with an alignment angle of 180 degrees. The X-axis indicates the driving frequency of an alternating voltage applied to the two electrodes in each panel. The range of driving frequencies is between 2OHz and 20KHz. The Y-axis indicates sound pressure (dB) measured by a microphone located 15mm above the electrodes. Curve A shows the sound pressure of the ferro-electric liquid-crystal panel of the present invention. Curve B shows the sound pressure of a conventional ferro-electric liquid-crystal panel. It is clear from this graph that the sound pressure of the ferro-electric liquid-crystal panel of the present invention is sufficiently high, but that of the conventional ferro-electric liquid-crystal panel is too low in its sound pres sure to be used as a sound generating device.

FIG. 5 is a graph showing sound pressure C of a conventional ferro-electric liquid-crystal panel with an alignment angle of 100 degrees, used as a sound generating device. Measurements are taken in the manner explained above. From this graph, it can be seen that the level of sound pressure in the ferro-electric liquid-crystal panel of the present invention is substantially the same as that of the conventional ferro-electric liquid-crystal panel exclusively designed as sound generating device.

Figure 6:
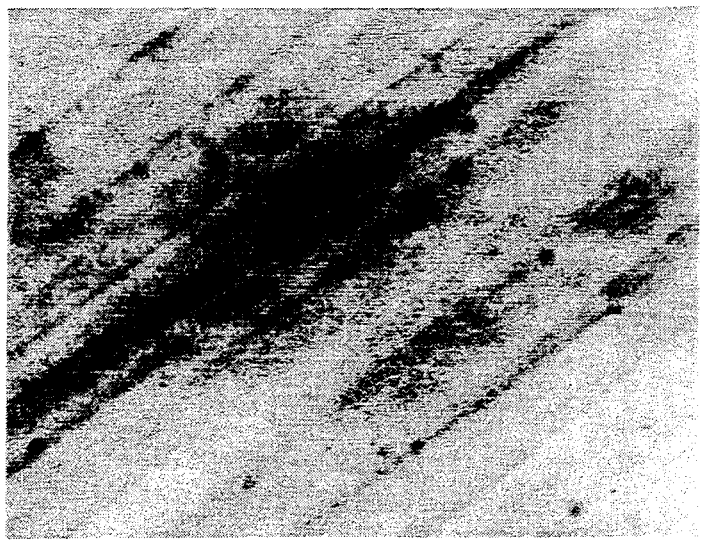
FIGS. 6 and 7 are polarizing micorphotographs showing alignment of the ferro-electric liquid-crystal panel of the present invention, and that of a conventional ferro-electric liquid-crystal panel designed exclusively as a sound generating device, respectively.
Figure 7:
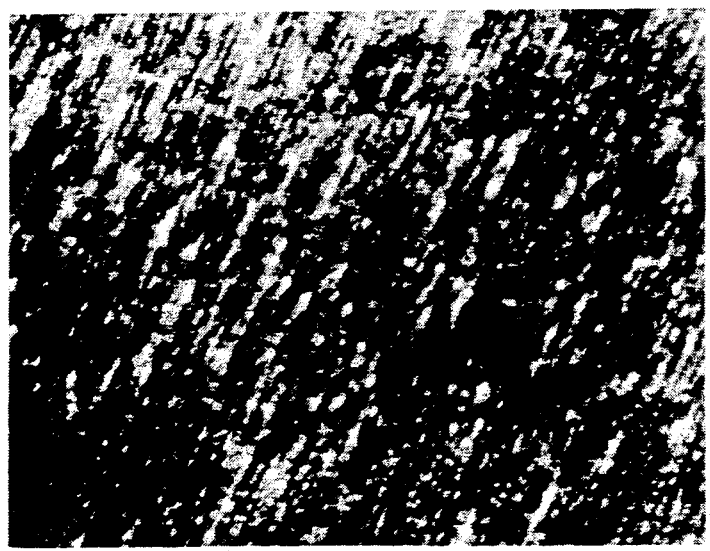

FIGS. 6 and 7 are polarizing microphotographs (50x) showing the alignment of ferro-electric liquid-crystal panels. FIG. 6 shows a ferro-electric liquid-crystal panel with an alignment angle of 130 degrees according to the present invention. FIG. 7 shows a conventional ferro-electric liquid-crystal panel with an alignment angle of 100 degrees designed exclusively as a sound generating device. From the two polarizing microphotographs, it can be seen that the ferro-electric liquid-crystal panel of the present invention has no irregular alignment and maintains an even alignment, whereas the conventional ferro-electric liquid-crystal panel has a number of defects and is subject to irregular alignment. In other words, the conventional ferro-electric liquid-crystal panel can be used as a sound generating device, but not as an indicator. The ferro-electric liquid-crystal panel of the present invention can be used both as a sound generating device and as an indicator.

If the alignment angle is too small, alignment is irregularly effected. If too large, sound pressure is reduced. Therefore, in accordance with the invention, the alignment angle is preferably between 110 and 150 degrees.

The ferro-electric liquid-crystal panel thus fabricated can be used as an indicator since it has no irregular alignment and can provide a fine and uniform indication, and as a sound generating device since it provides sufficient sound pressure.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

What we claim is:

1. A ferro-electric liquid-crystal panel having a front and comprising two substrates placed in facing relation with respect to one another, each of the substrates having an electrode and an alignment layer, and a ferro-electric liquid-crystal sealed therebetween such that molecules thereof are aligned in a homogeneous fashion and have a chiral-nematic mesophase in a phase translation system with a given twist direction, the improvement wherein the alignment direction of one of said alignment layers is twisted at an angle between 110 and 150 degrees relative to that of the other alignment layer, and in that the direction of twist defined by the alignment directions of said alignment layers, as viewed from the front, is opposite to the twist direction of said liquid-crystal molecules in said chiral-nematic mesophase.

2. A ferro-electric liquid-crystal panel having a front, comprising first and second spaced apart alignment layers, a ferro-electric liquid-crystal sealed between said alignment layers, molecules of said liquid-crystal being aligned in a homogeneous fashion and having a chiral-nematic mesophase in a phase translation system with a given twist direction, and first and second electrodes connected to said alignment layers, respectively, said first alignment layer having an alignment direction that is twisted at an angle from 110 to 150 degrees with respect to the alignment direction of said second alignment layer, the direction of twist defined by the alignment directions of said first and second alignment layers being opposite of the twist direction of the molecules of said liquid crystal in said chiral-nematic mesophase, as viewed from the front of said panel.

3. The ferro-electric liquid-crystal panel of claim 2, wherein said first and second electrodes comprise driving electrode layers on the sides of said first and second alignment layers, respectively, away from said liquid crystal.

4. The ferro-electric liquid-crystal panel of claim 3 further comprising first and second substrates, said first and second electrodes being sandwiched between said first and second substrates, and first and second alignment layers, respectively.

* * * * *